(12) United States Patent
Freigang et al.

(10) Patent No.: US 6,250,327 B1
(45) Date of Patent: Jun. 26, 2001

(54) FLUID FLOW VALVE WITH VARIABLE FLOW RATE

(75) Inventors: Alan R. Freigang, Scotts; James A. Beverly; Kurt R. Gerlofs, both of Kalamazoo, all of MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/257,439

(22) Filed: Feb. 25, 1999

(51) Int. Cl.$^7$ .............................. F16K 15/02; B60C 23/00
(52) U.S. Cl. .................. 137/225; 137/226; 137/493.9; 137/513.5; 152/415
(58) Field of Search ...................... 137/224, 225, 137/226, 493.9, 513.3, 513.5; 152/415, 416

(56) References Cited

U.S. PATENT DOCUMENTS

| | | |
|---|---|---|
| 3,521,662 * | 7/1970 | Bache ........................ 137/493.9 X |
| 4,434,833 | 3/1984 | Swanson et al. . |
| 4,619,303 | 10/1986 | Bryan et al. . |
| 4,640,331 | 2/1987 | Braun . |
| 4,754,792 | 7/1988 | Braun et al. . |
| 4,782,879 | 11/1988 | Le Chatelier et al. . |
| 4,825,925 | 5/1989 | Schultz . |
| 4,860,579 | 8/1989 | Beverly . |
| 4,877,048 | 10/1989 | Oltean et al. . |
| 4,883,105 | 11/1989 | Schultz . |
| 4,893,664 | 1/1990 | Oltean . |
| 4,895,199 * | 1/1990 | Magnuson et al. .................. 152/415 |
| 4,898,216 | 2/1990 | Schultz et al. . |
| 4,922,946 | 5/1990 | Boulicault . |
| 4,924,926 | 5/1990 | Schultz et al. . |
| 5,022,438 | 6/1991 | Faraon-Chaul ........................ 138/42 |
| 5,134,860 * | 8/1992 | Drucker ........................ 137/513.3 X |
| 5,141,589 | 8/1992 | Mittal . |
| 5,174,839 | 12/1992 | Schultz et al. . |
| 5,253,687 | 10/1993 | Beverly et al. . |
| 5,273,064 | 12/1993 | Beverly et al. . |
| 5,309,969 | 5/1994 | Mittal . |
| 5,411,055 * | 5/1995 | Kane .................................. 137/513.5 |
| 5,540,268 | 7/1996 | Mittal . |
| 5,553,647 * | 9/1996 | Jaksic .................................. 152/415 |
| 5,560,792 * | 10/1996 | Anthony .............................. 152/415 |
| 5,613,518 * | 3/1997 | Rakieski ............................ 137/513.5 |
| 5,689,972 * | 11/1997 | Schuster et al. .............. 137/513.3 X |
| 5,947,172 * | 9/1999 | Glotin .............................. 152/415 X |

FOREIGN PATENT DOCUMENTS

| | | |
|---|---|---|
| 33 17 810 | 5/1983 | (DE) . |
| 195 28 451 A1 | 2/1997 | (DE) . |
| 1236014 | 6/1960 | (FR) . |
| 2 288 261 | 5/1976 | (FR) . |

* cited by examiner

Primary Examiner—John Rivell
Assistant Examiner—Meredith H. Schoenfeld
(74) Attorney, Agent, or Firm—Dykema Gossett PLLC

(57) ABSTRACT

An improved fluid flow valve (10) for a fluid flow control system. The flow valve (10) includes a flow-regulating assembly (40) having a housing (44) having a piston bore (15) within which is slideably disposed a piston-like member (42). The piston-like member (42) has a primary flow passage (52) and at least one secondary flow passage (54) formed therein. A first portion (42a) of the pistonlike member (42) is configured for mating with a seat (46) of the housing (44), and a resilient member (48) biases the piston-like member (42) away from the seat (46). When at least a predetermined fluid pressure differential exists, the first portion (42a) mates with the seat (46) and causes the at least one secondary flow passage (54) to be at least substantially closed such that fluid can substantially flow only through the primary flow passage (52).

16 Claims, 3 Drawing Sheets

FLUID FLOW VALVE WITH VARIABLE FLOW RATE

BACKGROUND OF THE INVENTION

The present invention relates to an improved valve for fluid flow systems. In particular, the present invention is concerned with an improved wheel valve for central tire inflation systems (CTI systems), also known as on-board inflation systems and traction systems, wherein the inflation pressure of vehicle tires may be monitored and controlled from a remote location on the vehicle with the vehicle at rest or in motion.

Various types of systems have been suggested in the past for controllably inflating and deflating vehicle tires during vehicle operation. Such systems typically include a source of air under pressure and controls for selectively increasing or decreasing an existing tire pressure, and for checking to determine the existing tire pressure for each tire. The ability to selectively increase or decrease tire pressure is desirable in connection with optimizing the operation of the vehicle under widely changing conditions including weather, vehicle load, terrain and vehicle speed. It is also desirable to provide adaptability for isolating the air under pressure in each vehicle tire from the remainder of the system so that a problem such as a leak in one tire does not affect the air pressure in the other tires. Further, in connection with such a tire isolating feature, an air line from the system's source of air under pressure extends to a vehicle tire generally through the fixed axle upon which the tire and its associated wheel assembly are rotatably mounted and across a sealing arrangement between the fixed and rotating parts. The tire isolating wheel valve is preferably between the sealing arrangement and tire so that the sealing arrangement is not subjected to system air under pressure other than at times of operation of the system to accomplish inflation, deflation or pressure checking.

CTI systems are well known in the prior art, as may be seen by reference to U.S. Pat. Nos. 5,253,687; 5,174,839; 5,273,064; 4,619,303; 4,754,792; 4,782,879; 4,825,925; 4,860,579; 4,877,048; 4,883,105; 4,893,664; 4,898,216; 4,917,163; 4,922,946; and 4,924,926. The entire disclosure of each of these patents is incorporated herein by reference.

Generally, the prior art CTI systems have employed a pneumatically controlled wheel valve that is affixed to each vehicle wheel assembly for effecting tire pressure inflation/deflation in response to pressure signals from an air control circuit. The air control circuit is connected to each wheel valve via a rotary seal assembly associated with each wheel valve. Rotary seals are utilized which are located in a well protected inboard location (see U.S. Pat. No. 4,434,833 assigned to the Assignee of this invention), utilizing valves and conduits of a relatively rugged proven construction which may be located at a protected location or inside the vehicle tire to protect same. Wheel valves automatically isolate those tires having less than a predetermined minimum reference pressure from the remainder of the system. Valve operations exhaust internal pressure on the rotary seals during steady state operation of the system.

The above is accomplished by providing a central tire inflation system for a vehicle utilizing a wheel valve assembly comprising a wheel valve and a low tire pressure shutoff valve at each wheel end assembly (usually a single or dual tire) where the valve assembly is connected to the central control system by a single pressure line or conduit through a rotary seal assembly and pressurization of which single pressure conduit is effective to open and close communication to the vehicle tire and to cause inflation and/or deflation of said tire to a selected pressure. The wheel valve assembly may be located exteriorly of the tire or may be located interiorly of the tire such as in the bead lock portion thereof. The low tire pressure shutoff valve is effective to automatically isolate the tire associated therewith from the remainder of the central tire inflation system when the inflation pressure thereof is below a predetermined minimum reference value, or when the system is in an inactive mode.

The single pressure conduit leading to the rotary seal at the wheel hub assembly is connected to a source of pressurized fluid through a plurality of control valves which are effective to open communication to the tire to measure the existing pressurizing thereof, to cause inflating or deflation of the tire as required, to establish or block communication to the tire from the central tire inflation system and to exhaust the single pressure line during steady state conditions of the tire inflation system and to relieve pressure on the rotary seals. Preferably, the control valves, which may be separate or provided in a single valve block, are operated by a control, preferably a microprocessor control, which senses the tire inflation value selected by the operator, senses vehicle velocity and the current pressure condition of the tire pressures, vehicle air brake system and the inflation system reservoir.

Although these prior art CTI systems have functioned well in the past, newer applications for CTI systems have been developed that have the dual requirements of fast deflation rates and the capability of inflating the tires to high pressure levels (75 psig and higher). Although some prior art systems are able to accommodate both of these operating requirements, such systems are undesirably complicated, typically requiring multi-diaphragm valves and/or venting or exhausting at the wheel. Less complicated, single diaphragm valve systems, without venting or exhausting at the wheel, have heretofore been able to completely accommodate only one of these two operating requirements. This is because prior art single diaphragm valve systems have accommodated faster deflation rates by using a wheel valve with a larger seat orifice through which larger volumes of air can be exhausted. However, the widening of the seat orifice causes increased pressure forces which tend to keep the wheel valve open when high pressure shutoff is desired, thus leading to degraded and less accurate shutoff performance and a lowered maximum tire inflation pressure.

Since the rate of deflation varies exponentially with the pressure differential between the tire and the ambient air, the deflation rate slows considerably once lower tire pressures are encountered. To maintain a relatively rapid rate of deflation at these lower tire pressures, the opening of the exhaust valve must be of a relatively large cross-sectional area to permit an outflow of air.

A large cross-sectional area results in large forces when the air pressure is at a high level because the force generated when closing the valve is proportional to the cross-sectional area. Specifically, the force is approximately equal to the air pressure multiplied by the cross-sectional area. Thus, if an exhaust valve having a large cross-sectional area is needed for rapid tire deflation then large forces will be generated when closing off the outlet at higher pressures. Using prior art valves, these forces have exceeded the available closing force and the exhaust valve remains open despite the command to close off. The challenge has been how to obtain rapid deflation at low tire pressures while limiting the pressure induced forces that must be handled in the wheel valve at high pressure.

Another problem with prior art wheel valves is that they are vented to atmosphere. The vent in the wheel valve provides an opening through which contaminants such as dust and/or sand can be drawn into the valve thereby causing operational failure of the valve.

Thus, an improved single diaphragm wheel valve is needed that, without exhausting or venting at the wheel, can accommodate the newer CTI system applications by providing both fast deflation rates and the capability of providing reliable valve shutoff at high pressure levels.

SUMMARY OF THE INVENTION

The present invention provides an improved fluid flow valve and associated flow-regulating assembly which meets all of the above-identified needs for use as a wheel valve in a CTI system.

The fluid flow valve of the present invention includes a first housing having an inlet port and an outlet port. Within the first housing is a valve device for allowing and preventing air communication between the inlet and outlet ports. The valve device includes a flow-regulating assembly having a second open-ended housing within which is slideably disposed a piston-like member. The piston-like member has a primary flow passage and at least one secondary flow passage formed therein for enabling the flow of fluid through the second housing. The piston-like member further includes a first portion configured for mating with a seat of the second housing, and a resilient member biases the piston-like member away from the seat. When at least a predetermined higher fluid pressure differential exists between the pressures at the opposite sides of the piston-like member, the first portion mates with the seat and causes the at least one secondary flow passage to be at least substantially closed such that fluid can substantially flow only through the primary flow passage.

One provision of the present invention is to provide an air flow control valve having a relatively large orifice at lower operating pressures.

Another provision of the present invention is to provide an air flow control valve having a relatively large orifice which can be reliably closed at any operating pressure.

Another provision of the present invention is to provide an airflow control valve for a central tire inflation system which accommodates downstream flow restrictions.

Another provision of the present invention is to provide an air flow control valve having a relatively large orifice for operation at lower operating pressures and a relatively small orifice for operation at higher operating pressures.

Another provision of the present invention is to provide an air flow control valve for a central tire inflation system having a relatively large orifice for operation at low tire pressures and a smaller orifice for operation at higher tire pressures.

Still another provision of the present invention is to provide an air flow control valve for a central tire inflation system having a relatively large orifice for operation at low tire pressures and a smaller orifice for operation at higher tire pressures with no external venting.

Other details, objects, and advantages of the present invention will become more apparent with a reading of the following description.

DESCRIPTION OF THE PREFERRED EMBODIMENT

Figure 1:
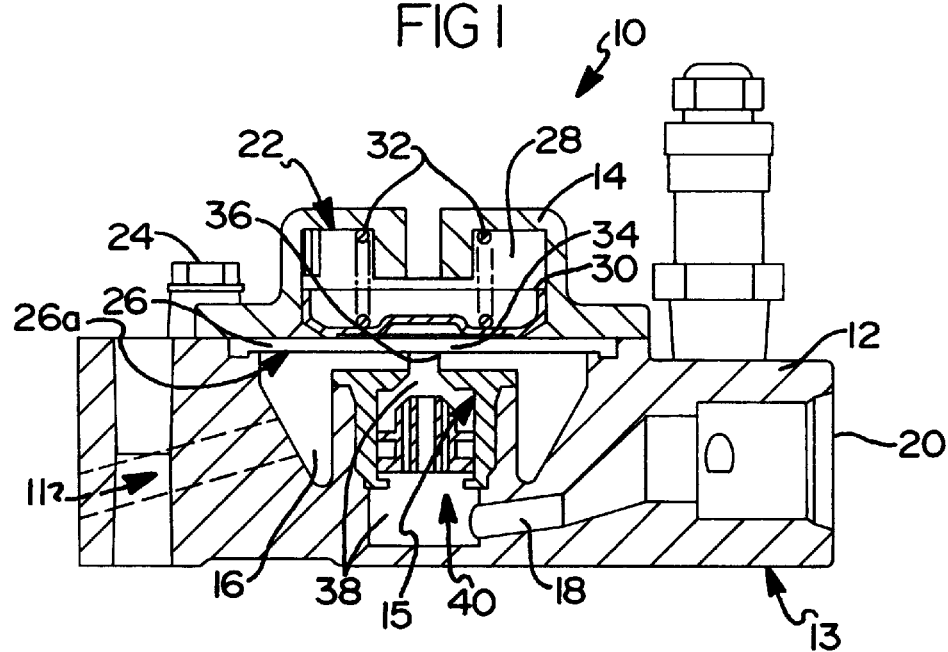
FIG. 1 is an enlarged sectional view of a wheel valve assembly embodying the present invention.

In the following description of the present invention, certain terms will be utilized for purposes of reference only and are not intended to be limiting. The terms "upward", "downward", "rightward" and "leftward" refer to directions in the drawings to which reference is made. The terms "inward" and "outward", respectively, refer to directions towards and away from, respectively, the geometric center of the device described. The terms "inflation" and "deflation, respectively, refer to increased and decreased, respectively, pressurization of a tire or the like. Said terminology will include the words above specifically mentioned, derivatives thereof and words of similar import.

Referring now to FIG. 1, shown is an enlarged sectional view of wheel valve assembly 10 embodying the present invention. Assembly 10 comprises a valve housing 13 including a housing body 12 having a piston bore 15 formed therein and a housing cover 14, a control port 16 in continuous communication with inlet port 11 (that is connected to conduit 100 through an annular chamber 82 at the axle housing 86, see FIG. 5), a channel 18, tire or outlet port 20, and a valve device 22 operative to both allow and prevent air communication between control port 16 and tire port 20. In the preferred embodiment, valve device 22 is a diaphragm valve device, as described below. Housing body 12 and housing cover 14 are secured together by a plurality of fasteners 24.

Diaphragm valve device 22 includes a spring chamber 28, a flexible diaphragm 26 that separates spring chamber 28 from control port 16, a rigid cup-shaped member 30 slideably disposed in spring chamber 28 and biased against diaphragm 26 by a spring 32, a valving member 34 defined by a center portion of diaphragm 26, and a valve seat 36 disposed at one end of a passage 38 that communicates at its other end with tire port 20 via a channel 18. Spring 32 biases valving member 34 into a closed position or sealing engagement with valve seat 36 with a force sufficient to maintain the sealing engagement when the highest contemplated tire pressure is experienced.

Valving member 34 is moved to an open position against the force of spring 32 in response to a predetermined minimum positive air pressure in control port 16 acting on diaphragm surface 26a. Such an air pressure may be provided by any suitable air control circuit known to one of ordinary skill in the art. In this manner, inflation or deflation of a vehicle's tire may be effected. If the air pressure acting on diaphragm surface 26a is greater than the tire pressure of tire port 20 (and at least the predetermined minimum positive air pressure to open valving member 34), then air will flow into the tire, thus causing inflation. If the air pressure acting on diaphragm surface 26a is less than the tire pressure of tire port 20 (but at least the predetermined minimum positive air pressure to open valving member 34), then air will flow out of the tire, thus causing deflation.

Figure 3:
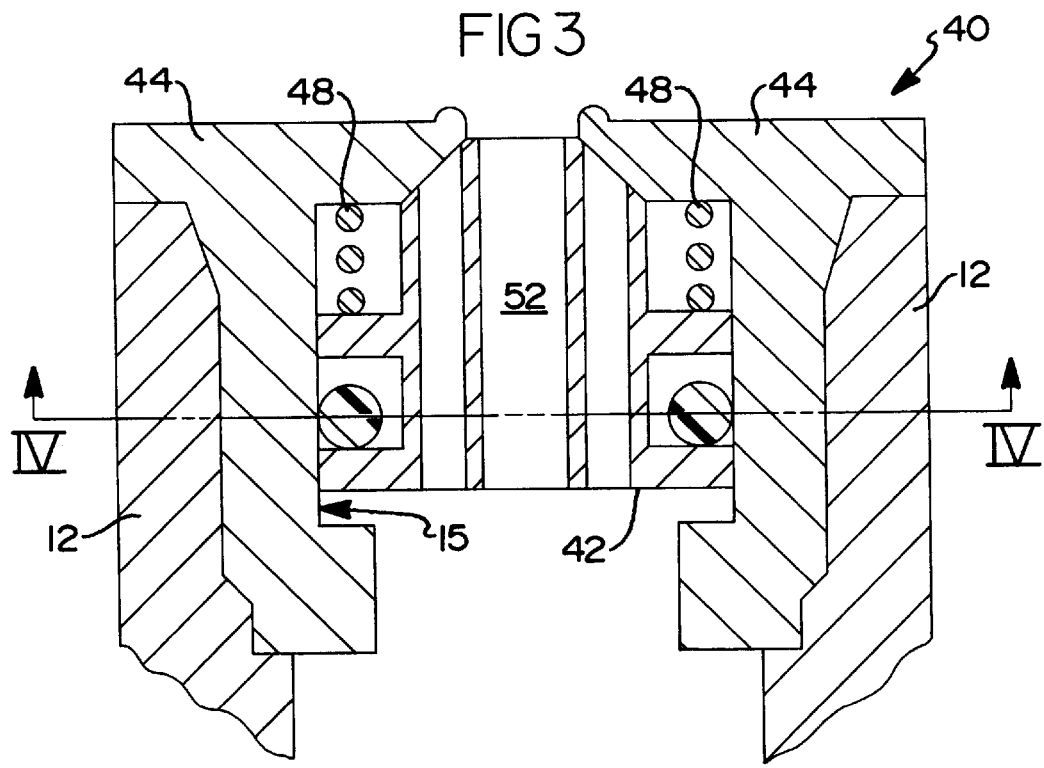
FIG. 3 is a view of the piston assembly of FIG. 2, shown in a closed, flow restricted, position.
Figure 4:
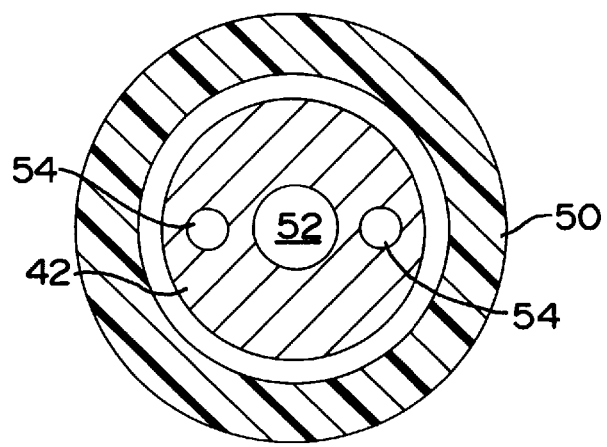
FIG. 4 is a cross-sectional view of a part of the piston assembly of FIG. 3, taken along the line IV—IV.

Diaphragm valve device 22 also includes a piston or flow-regulating assembly 40 disposed within passage 38. As shown in greater detail in FIGS. 2 and 3, piston assembly 40 of a preferred embodiment comprises a piston 42 slideably disposed within the piston bore 15 of an open-ended housing 44 and biased away from a seat 46 by a resilient member preferably comprising a spring 48. Stops 49 are included in housing 44 in order to limit the range of movement of piston 42. As described in greater detail below, the amount of compression of spring 48, and therefore the position of piston 42, depends upon the pressure differential between the top or first portion 42a and bottom or second portion 42b of piston 42. Piston 42 has internal channels or passages axially formed therein comprising a primary or main flow passage 52 and secondary flow passages 54. Fluid may flow in either direction through these flow passages, as described in greater detail below. FIG. 4 shows a cross-sectional view of piston-like member 42 taken along the line IV—IV of FIG. 3, showing the shape and configuration of the parallel flow passages 52 and 54 of the preferred, non-limiting embodiment.

Figure 2:
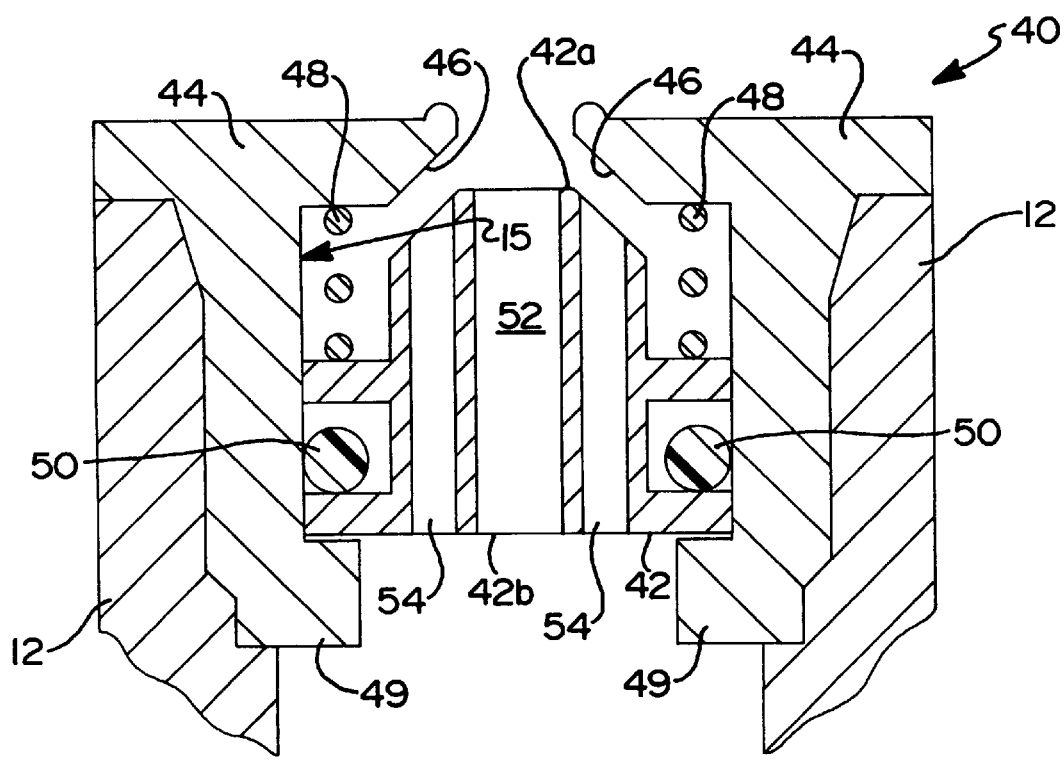
FIG. 2 is an enlarged view of the piston or flow-regulating assembly of the wheel valve assembly of FIG. 1, shown in normal position.

FIG. 2 shows piston assembly 40 in the "increased flow" position, with spring 48 in its fully expanded state and both primary and secondary flow passages 52 and 54 open. Piston assembly 40 is moved to a fully open position where the piston 42 contacts the stops 49. When the tire is being filled with air the fluid is flowing in a downward direction thereby filling the tire, the piston 42 is moved toward the stops 49 by action of the spring 48 and both the flow passages 54 and the primary flow passage 52. FIG. 3 shows piston assembly 40 in the closed or "reduced flow" position, with spring 48 in its fully compressed state and secondary flow passages 54 substantially closed.

The top portion 42a of piston 42 is suitably configured to mate with piston seat 46 when piston 42 is at the top of its potential travel path. In the preferred, non-limiting embodiment shown in FIGS. 1–3, the mating relationship of top portion 42a and seat 46 is frusto-conical. This mating causes secondary flow passages 54 to become at least substantially closed, thus enabling fluid to substantially flow only through primary flow passage 52 when fluid is flowing in an upward direction thereby lowering the tire pressure in a CTI system. Spring 48 becomes substantially compressed and enables such mating between portion 42a and piston seat 46 whenever the pressure at or near bottom portion 42b of piston 42 exceeds the pressure at or near top portion 42a of piston 42 by at least a predetermined amount—in other words, whenever at least a predetermined fluid pressure differential exists.

The value of the above-mentioned predetermined fluid pressure differential for a particular flow-regulating assembly 40 depends upon many factors, including without limitation the surface areas and configurations of top and bottom portions 42a and 42b of piston 42, the dimensions of primary and secondary flow passages 52 and 54, and the resiliency of resilient member 48. Those characteristics shown in FIGS. 1–3 are only of a preferred embodiment of piston assembly 40. By adjustment of these factors, one may establish an appropriate value for the predetermined fluid pressure differential for a given situation, thereby ensuring that the reduced flow position is assumed at the desired time for appropriate shutoff performance.

The appropriate dimensions of primary and secondary flow passages 52 and 54 depends upon the application. In the vehicular tire pressure system environment, in which the operation of the invention is described in detail below, primary flow passage 52 should be small enough so that, at the highest contemplated tire pressure levels, the volume of fluid flowing therethrough does not exert undesirably large back pressures on valving member 34 when piston assembly 40 is in the reduced flow position. What constitutes excessive back pressure depends upon the composition and surface area of valving member 34 of diaphragm 26 and upon other sources of flow restriction such as rotary seals 78 and 80 (see FIG. 5). Secondary flow passages 54 should be dimensioned so that, when piston assembly 40 is in the normal increased flow position (see FIG. 2), the flow rate through passages 54 in combination with the flow rate through primary flow passage 52 enables fast deflation at a desired rate when medium to low tire pressures exist.

Piston 42 preferably, but not necessarily, includes an O-ring 50, preferably of conventional polymer material, that provides a sealing engagement between piston 42 and the sides of piston housing 44 whereby any flow of fluid through valve device 22 is only through flow passage 52 and (possibly) flow passages 54.

In operation of wheel valve assembly 10 in a vehicular tire pressure system, piston assembly 40 is in the increased flow position (such as that shown in FIG. 2) throughout an inflation sequence due to the force generated by the spring 48. Upon termination of an inflation sequence when shutoff takes place, the air pressure acting on diaphragm surface 26a becomes lower than the predetermined minimum positive air pressure required to keep valving member 34 open. In this shutoff situation, the position of piston assembly 40 depends upon the pressure to which the tire has been inflated. If the differential pressure due to the air flow through the valve 10 is high enough, then the pressure at bottom portion 42b of piston 42 will exceed the pressure at top portion 42a by at least the predetermined amount. This causes piston assembly 40 to assume the reduced flow position shown in FIG. 3. In the reduced flow position, fluid can substantially flow outward (from tire port 20 to the inlet port) only through primary flow passage 52, thus reducing the back pressure exerted on valving member 34 by the relatively high tire pressure. This enables valving member 34 to close leading to improved shutoff performance whereby increased specific maximum tire inflation pressures can be accurately attained. It should be noted that the closing of valving member 34 will cause the pressures on both sides of piston 42 to eventually equalize, thereby causing piston assembly 40 to eventually assume the increased flow position such as that shown in FIG. 2 due to force generated by spring 48.

If, on the other hand, the tire pressure at tire port 20 is not high enough at inflation shutoff to cause the pressure at bottom portion 42b of piston 42 to exceed the pressure at top portion 42a by at least the predetermined amount, then piston assembly 40 will remain in the increased flow position such as that shown in FIG. 2. Although fluid can flow through all flow passages in this situation, the back pressure exerted on valving member 34 is relatively low due to the lower tire pressure. This enables valving member 34 to still close resulting in good shutoff performance and the ability to accurately inflate to particular tire pressures.

In a deflation sequence, the air pressure acting on diaphragm surface 26a is less than the tire pressure of tire port 20. Thus, the pressure at bottom portion 42b of piston 42 is greater than the pressure at top portion 42a. The position of piston assembly 40 depends upon whether or not this fluid pressure differential is at least equal to the predetermined fluid pressure differential described above. At the beginning of the typical deflation sequence when high tire pressures exist, the fluid pressure differential is greater than the predetermined fluid pressure differential, thus causing piston assembly 40 to be in the reduced flow position of FIG. 3. This position, although less conducive to deflation since flow is hampered, does not seriously affect deflation times because the large pressure differential forces air quickly out through primary flow passage 52. It should be noted that the reduction in outward flow caused by movement into the reduced flow position causes the pressure differential to increase beyond the predetermined fluid pressure differential, thereby at least temporarily "latching" piston assembly 40 in that position. However, if the deflation sequence continues, eventually the fluid pressure differential will be less than the predetermined differential, thus causing piston assembly 40 to assume the increased flow position such as that shown in FIG. 2. In this situation, the smaller pressure differential is unable to force air out with as much force as before since the rate of flow decreases exponentially with pressure. However, the additional flow area through secondary flow passages 54 compensates for this smaller pressure differential and enables deflation to continue at an increased rate.

Upon termination of a deflation sequence when shutoff takes place, the air pressure acting on diaphragm surface 26a becomes lower than the predetermined minimum positive air pressure required to keep valving member 34 open. Similar to the inflation shutoff situation, the position of piston assembly 40 in the deflation shutoff situation depends upon the pressure to which the tire has been deflated. If the tire pressure at tire port 20 is high enough, then the pressure at bottom portion 42b of piston 42 will exceed the pressure at top portion 42a by at least the predetermined amount. This causes piston assembly 40 to be in the reduced flow position shown in FIG. 3. In the reduced flow position, fluid can substantially flow outward only through primary flow passage 52, thus reducing the back pressure exerted on valving member 34 by the relatively high tire pressure. This enables valving member 34 to close leading to improved shutoff performance and the ability to accurately deflate to particular tire pressures.

If, on the other hand, the tire pressure at tire port 20 is not high enough at deflation shutoff to cause the pressure at bottom portion 42b of piston 42 to exceed the pressure at top portion 42a by at least the predetermined amount, then piston assembly 40 will be in the increased flow position such as that shown in FIG. 2. Although fluid can flow through all flow passages in this situation, the back pressure exerted on valving member 34 is relatively low due to the lower tire pressure. This enables valving member 34 to still close again resulting in good shutoff performance and the ability to accurately deflate to particular tire pressures.

Although the preferred embodiment of the present invention is shown with two secondary flow passages 54 formed in piston-like member 42, it should be understood that one such secondary flow passage, or three or more secondary flow passages, may be employed. Also, flow passages 52 and 54 can be of any suitable shape or form, and piston seat 46 and top portion 42a of piston 42 can be configured in any mating relationship whereby at least one secondary flow passage is substantially closed when piston 42 is at the top of its potential travel path. Furthermore, although spring 48 is implemented in the preferred embodiment, it should be recognized that any suitable resilient member may be employed in place thereof.

Although piston or flow-regulating assembly 40 is implemented in the preferred embodiment in a single diaphragm valve, it should be appreciated that flow-regulating assembly 40 can be implemented in a multi-diaphragm valve, or any other type of fluid flow valve, as well.

The variable flow valve and associated flow-regulating assembly of the present invention finds application in any type of fluid flow control system, where fluid may comprise any matter of substantially gaseous or liquid form. The present invention is described below with particular reference to wheel valves of vehicular tire air pressure systems, specifically single-diaphragm wheel valves, for exemplary purposes only. Because the general structure and functioning of such tire pressure systems are well known in the art, the components of such systems, apart from the wheel valves, are not described in great detail herein except as follows.

Figure 5:
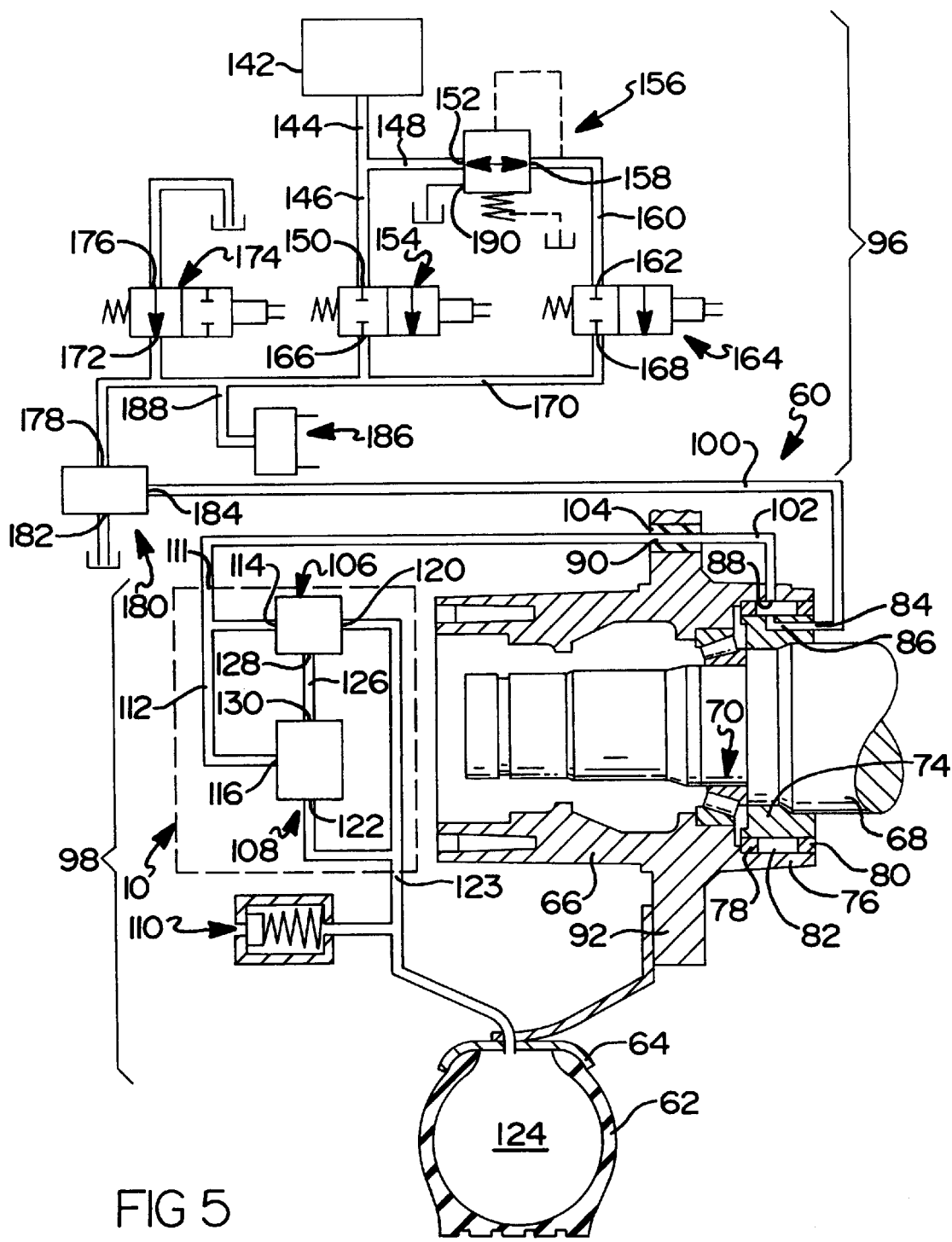
FIG. 5 is a schematic illustration of an example vehicular central tire inflation system in which the present invention may be implemented.

The pneumatic components of the central tire inflation system 60 as utilized to control the inflation pressure of a single tire 62 may be seen by reference to FIG. 5. Inflatable tire 62 is mounted to a tire rim 64 which is fixed to a wheel hub assembly 66 rotationally supported on the outer end of an axle housing 68 by means of bearings 70. An axle shaft (not shown) rotationally driven by conventional means, such as a differential (not shown), extends from the axle housing 68 and typically includes a flange (not shown) for drivingly connecting the axle shaft to the wheel hub. As may be seen in greater detail by reference to U.S. Pat. No. 4,434,833, assigned to the Assignee of this invention, an annular sleeve 74 may be pressed to the axle housing at a location inboard of the bearings 70 and the wheel hub may define and inboardly extending sleeve-type annular flange 76 telescopically surrounding sleeve 74. A pair of rotary seals 78 and 80 extend radially between the outer periphery of sleeve 74 and the inner periphery of sleeve-type flange 76 to define an annular sealed chamber 82 therebetween. Sleeve 74 is provided with an inlet 84 and a passage 86 opening to the chamber 82. Sleeve-type flange 76 is provided with a generally radially extending passage 88 extending from the sealed annular chamber 82 to the exterior outer diameter surface thereof. A single passage 90 may be provided in the radial flange portion 92 of the wheel hub 66 for passage of a pressure conduit. The above construction is described in above mentioned U.S. Pat. No. 4,434,833 and forms no part of the present invention. It is understood, of course, that the present invention is equally applicable to wheel hub/axle housing assemblies (also called "wheel-end assemblies") of other constructions.

The central tire inflation system 60 may be considered to comprise two components, a stationary components 96 fixed to the vehicle chassis and a rotational component 98 rotationally fixed to the wheel hub 66 and tire 62. The stationary component 96 is fluidly connected to the rotational component 98 by means of the annual chamber 82 defined by the rotary seals 78 and 80. Briefly, fluid conduit 100 from the stationary component 96 is fluidly connected to the inlet 84 of passage 86 formed in sleeve 74 while fluid conduit 102 leading to the rotational component 98 is fluidly connected to the passage 88 formed in sleeve-type flange 76 and passes through the opening 90 defined in the flange 92 of the hub 66. To protect conduit 102, a grommet or bushing 104 may be provided in the opening 90 or opening 90 may be defined by a bore in a wheel stud. Of course, alternatively, a passage may be provided in hub 66 opening to the outboard side thereof. It may thus be seen that attachment of system 60 to a wheel end assembly requires no drilling of the axle housing 68 and drilling of only a single hole 90 through radial flange 92 of the wheel hub 66. It is noted that the rotary seals 78 and 80 and the conduit 100 leading to the wheel end assembly may be located inboard of the bearings 70 in a relatively protected location on the vehicle.

Rotating component 98 of system 60 includes a low pressure shutoff valve 106, a control valve 108 which can be combined into one wheel valve assembly 10 as shown in FIG. 1 and is the subject of the present invention, and a manual inflate and pressure check valve 60. The wheel valve assembly 10 (low pressure valve 106 and control valve 108) may be located interiorly of tire 62.

A manifold portion 112 of conduit 102 interconnects ports 114 and 116 of valves 106 and 108, respectively, with one another and with the conduit 100 via chamber 82 while a manifold conduit 118 interconnects ports 120 and 122 of valves 106 and 108, respectively, the manual inflate and check valve 110, and with the interior chamber 124 of the inflatable pneumatic tire 62. The present invention combines the shutoff valve 106 with the control valve 108 into a wheel valve assembly 10 having an inlet port 111 and an outlet port 123. A conduit 126 interconnects ports 128 and 130 of valves 106 and 108, respectively. If dual tires are utilized, manifold conduit 118 may be split downstream of the valve 110 and manual shutoff valves provided to isolate the tires if required.

The relatively stationary portion 96 of the central tire inflation system 60 is mounted at convenient points on the vehicle chassis, preferably above the fording level of the vehicle, and is fluidly connected to the rotating portion 98 by means of a single conduit 100 and a single rotating seal chamber 82.

The relatively stationary portion 96 includes a source of pressurized fluid 142 which is typically the vehicle air system compressor, or, preferably, a pressurized air reservoir supplied by the compressor. Heavy duty trucks are typically equipped with an air compressor for an onboard compressed air system consisting of air brakes, transmission and/or axle shift actuators and/or controls, air suspensions and the like. If the vehicle is not otherwise provided with an air system, a separate compressor and/or reservoir or may be provided for the central tire inflation system 60.

The source of pressurized fluid supplies compressed air to a split conduit 144 which defines branches 146 and 148 leading to the inlets 150 and 152, respectively, of inflate valve 154 and pressure regulator 156, respectively. Pressure regulator 156 defines an outlet 158 connected to a conduit 160 leading to the outlet 162 of deflate valve 164. The outlet 166 of inflate valve 154 and inlet 168 and deflate valve 164, respectively, are connected to a manifold conduit 170. Manifold conduit 170 is also connected to the inlet 172 of shutoff valve 174. Shutoff valve 174 has an outlet 176 connected to exhaust. Manifold conduit 170 is also connected to port 178 of quick-release valve 180. A pressure transducer 186 is exposed to the pressure in conduit 170 by means of a branch conduit 188.

Quick-release valve 180 defines a port 182 connected to exhaust and a port 184 connected to the conduit 100 leading to the wheel end assembly.

Pressure regulator 156 may be of any conventional design and will limit pressure flowing therethrough to conduit 160 to a relatively low pressure of about 8–18 psi, and further includes a relief port 190 leading to exhaust. Accordingly, it may be seen that the inlet 150 to the inflation valve 154 is exposed to supply pressure while the outlet 162 of deflate valve 164 is in communication with a regulated pressure of about 8–10 psi. As will be seen, pressure regulator 156 regulates the quick-release valve 180 and thus regulates the minimum pressure to which system 60 will deflate tire 62.

Inflate valve 154, deflate valve 164 and shutoff valve 174 are each relatively small flow two-way valves, preferably solenoid controlled valves, of conventional design. Valves 154, 164 and 174 have a first or closed position blocking fluid flow between the inlet and outlet ports thereof and a second or open position permitting fluid flow between the inlet and outlet ports thereof. Typically, the solenoid two-way valves 154 and 164 are spring biased to the closed positions thereof while valve 174 is spring biased to the open position thereof.

As described above, the present invention provides an improved flow valve and associated flow-regulating assembly. In particular, the present invention provides an improved single diaphragm wheel valve that accommodates fast deflation rates and the capability of inflating tires to high pressure levels.

While the present invention has been described with a certain degree of particularity, it is understood that certain modifications of the invention and substitution and rearrangement of the parts therein may be possible and may be apparent to those skilled in the art from a reading and understanding of the specification. It is intended that all such modifications, substitutions, and rearrangements are included in the invention, insofar as they come within the spirit and scope of the appended claims.

We claim:

1. A wheel valve assembly (10) for a vehicular tire air pressure system (110), the assembly (10) comprising:
    a first housing (13) including an inlet port (11) and an outlet port (20);
    a valve device (22) in said first housing (13) including a valving member (34) movable between open and closed positions for respectively allowing and preventing air communication between said inlet (11) and outlet (20) ports, a first resilient member (32) for biasing said valving member (34) to said closed position, a valving surface (26a) responsive to positive air pressure in said inlet port (11) for moving said valving member (34) to said open position, and a flow regulating assembly (40) comprising:
        a second housing (44) having a first opening and a second opening and a piston bore (15) formed therebetween, said second housing (44) including a seat (46);
        a piston-like member (42) slideably disposed within said piston bore (15) and having a primary flow passage (52) and at least one secondary flow passage (54) formed therein for enabling the flow of air between said openings of said second housing (44), said piston-like member (42) having a first portion (42a) and a second portion (42b), said first portion (42a) configured for mating with said seat (46);
        a second resilient member (48) for biasing said piston-like member (42) away from said seat (46); and
        wherein said first portion (42a) mates with said seat (46) when at least a predetermined air pressure differential exists between the pressure at said second portion (42b) of said piston-like member (42) and the pressure at said first portion (42a) of said piston-like member (42), said mating causing said at least one secondary flow passage (54) to be at least substantially closed such that air can substantially flow only through said primary flow passage (52).

2. The wheel valve assembly (10) as defined in claim 1 wherein said valve device (22) is a single diaphragm valve device and said valving member (34) and said valving surface (26a) comprise a flexible diaphragm (26).

3. The wheel valve assembly (10) as defined in claim 1 wherein said primary flow passage (52) and said at least one secondary flow passage (54) are axially formed in parallel relationship within said piston-like member (42).

4. The wheel valve assembly (10) as defined in claim 1 wherein said at least one secondary flow passage (54) comprises two secondary flow passages.

5. The wheel valve assembly (10) as defined in claim 4 wherein the mating relationship of said first portion (42a) and said seat (46) is frusto-conical.

6. The wheel valve assembly (10) as defined in claim 1 wherein said first resilient member (32) and said second resilient member (48) each comprise a spring.

7. A flow-regulating assembly (40) for a fluid flow valve (10), the assembly (40) comprising:
   a housing (44) disposed within said fluid flow valve (10) and having a first opening proximate a valving member (34) of said fluid flow valve (10) and a second opening and a piston bore (15) formed therebetween, said housing (44) including a seat (46);
   a piston-like member (42) slideably disposed within said piston bore (15) and having a primary flow passage (52) and at least one secondary flow passage (54) formed therein for enabling the flow of fluid between said openings of said housing (44), said piston-like member (42) having a first portion (42a) and a second portion (42b), said first portion (42a) configured for mating with said seat (46);
   a resilient member (48) for biasing said piston-like member (42) away from said seat (46); and
   wherein said first portion (42a) mates with said seat (46) when at least a predetermined fluid pressure differential exists between the pressure at said second portion (42b) of said piston-like member (42) and the pressure at said first portion (42a) of said piston-like member (42), said mating causing said at least one secondary flow passage (54) to be at least substantially closed such that fluid can substantially flow only through said primary flow passage (52).

8. The flow-regulating assembly (40) as defined in claim 7 wherein said primary flow passage (52) and said at least one secondary flow passage (54) are axially formed in parallel relationship within said piston-like member (42).

9. The flow-regulating assembly (40) as defined in claim 7 wherein said at least one secondary flow passage (54) comprises two secondary flow passages.

10. The flow-regulating assembly (40) as defined in claim 9 wherein the mating relationship of said first portion (42a) and said seat (46) is frusto-conical.

11. The flow-regulating assembly (40) as defined in claim 7 wherein said resilient member (48) comprises a spring.

12. A fluid flow valve assembly (10) comprising:
   a first housing (13) including an inlet port (11) and an outlet port (20);
   a valve device (22) in said first housing (13) including a valving member (34) movable between open and closed positions for respectively allowing and preventing air communication between said inlet (11) and outlet (20) ports, and a flow regulating assembly (40) comprising:
      a second housing (44) having a first opening and a second opening and a piston bore (15) formed therebetween, said second housing (44) including a seat (46);
      a piston-like member (42) slideably disposed within said piston bore (15) and having a primary flow passage (52) and at least one secondary flow passage (54) formed therein for enabling the flow of fluid between said openings of said second housing (44), said piston-like member (42) having a first portion (42a) and a second portion (42b), said first portion (42a) configured for mating with said seat (46);
      a resilient member (48) for biasing said piston-like member (42) away from said seat (46); and
      wherein said first portion (42a) mates with said seat (46) when at least a predetermined fluid pressure differential exists between the pressure at said second portion (42b) of said piston-like member (42), said mating causing said at least one secondary flow passage (54) to be at least substantially closed such tat fluid can substantially flow only through said primary flow passage (52)
   wherein said valve device (22) is a single diaphragm valve device and said valving member (34) and said valving surface (26a) comprise a flexible diaphragm (26).

13. A fluid flow valve assembly (10) comprising:
   a first housing (13) including an inlet port (11) and an outlet port (20);
   a valve device (22) in said first housing (13) including a valving member (34) movable between open and closed positions for respectively allowing and preventing air communication between said inlet (11) and outlet (20) ports, and a flow regulating assembly (40) comprising:
      a second housing (44) having a first opening and a second opening and a piston bore (15) formed therebetween, said second housing (44) including a seat (46);
      a piston-like member (42) slideably disposed within said piston bore (15) and having a Primary flow passage (52) and at least one secondary flow passage (54) formed therein for enabling the flow of fluid between said openings of said second housing (44), said piston-like member (42) having a first portion (42a) and a second portion (42b), said first portion (42a) configured for mating with said seat (46);
      a resilient member (48) for biasing said piston-like member (42) away from said seat (46); and
      wherein said first portion (42a) mates with said seat (46) when at least a predetermined fluid Pressure differential exists between the pressure at said second portion (42b) of said piston-like member (42), said mating causing said at least one secondary flow passage (54) to be at least substantially closed such tat fluid can substantially flow only through said primary flow passage (52)
   wherein said primary flow passage (52) and said at least one secondary flow passage (54) are axially formed in parallel relationship within said piston-like member (42).

14. A fluid flow valve assembly (10) comprising:
   a first housing (13) including an inlet port (11) and an outlet sort (20);
   a valve device (22) in said first housing (13) including a valving member (34) movable between open and closed positions for respectively allowing and preventing air communication between said inlet (11) and outlet (20) ports, and a flow regulating assembly (40) comprising:
      a second housing (44) having a first opening and a second opening and a piston bore (15) formed therebetween, said second housing (44) including a seat (46);
      a piston-like member (42) slideably disposed within said piston bore (15) and having a primary flow passage (52) and at least one secondary flow passage (54) formed therein for enabling the flow of fluid between said openings of said second housing (44), said piston-like member (42) having a first portion (42a) and a second portion (42b), said first portion (42a) configured for mating with said seat (46);

a resilient member (48) for biasing said piston-like member (42) away from said seat (46); and wherein said first portion (42a) mates with said seat (46) when at least a predetermined fluid pressure differential exists between the pressure at said second portion (42b) of said piston-like member (42), said mating causing said at least one secondary flow passage (54) to be at least substantially closed such tat fluid can substantially flow only through said primary flow passage (52)

wherein said at least one secondary flow passage (54) comprises two secondary flow passages.

15. The fluid flow valve assembly (10) as defined in claim 14 wherein the mating relationship of said first portion (42a) and said seat (46) is frusto-conical.

16. The fluid flow valve assembly as defined in claim 14.

* * * * *

UNITED STATES PATENT AND TRADEMARK OFFICE
CERTIFICATE OF CORRECTION

PATENT NO. : 6,250,327 B1
DATED : June 26, 2001
INVENTOR(S) : Freigang et al.

It is certified that error appears in the above-identified patent and that said Letters Patent is hereby corrected as shown below:

Column 12,
Line 27, delete "Primary" and substitute -- primary -- therefor.
Line 37, delete "Pressure" and substitute -- pressure -- therefor.
Line 50, delete "sort" and substitute -- port -- therefor.

Column 14,
Line 8, after "claim 14" insert -- wherein said resilient member (48) comprises a spring --

Signed and Sealed this

Eighth Day of October, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.    : 6,250,327 B1
DATED         : June 26, 2001
INVENTOR(S)   : Friegang et al.

It is certified that error appears in the above-identified patent and that said Letters Patent is hereby corrected as shown below:

Column 12,
Lines 4 and 39, after "piston-like member (42)" insert -- and the pressure at said first portion (42a) of said piston-like member (42) --
Lines 7 and 42, delete "tat" and substitute -- that -- therefor.

Column 13,
Line 8, after "piston-like member (42)" insert -- and the pressure at said first portion (42a) of said piston-like member (42) --

Column 14,
Line 1, delete "tat" and substitute -- that -- therefor.

Signed and Sealed this

Fifth Day of August, 2003

JAMES E. ROGAN
*Director of the United States Patent and Trademark Office*